(12) United States Patent
Fukuda et al.

(10) Patent No.: US 6,615,381 B1
(45) Date of Patent: Sep. 2, 2003

(54) DIGITAL DATA TRANSMITTING/ RECEIVING METHOD, BASE STATION UNIT USED FOR TRANSMITTING/ RECEIVING DIGITAL DATA, AND MOBILE OBJECT TERMINAL UNIT USED FOR TRANSMITTING/RECEIVING DIGITAL DATA

(75) Inventors: Hisaya Fukuda, Ibaraki (JP); Akihiro Suzuki, Neyagawa (JP); Tomohiko Taniguchi, Moriguchi (JP); Akira Nohara, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/328,389

(22) Filed: Jun. 9, 1999

(30) Foreign Application Priority Data

Jun. 10, 1998 (JP) .......................... 10-162595

(51) Int. Cl.⁷ .......................... G06F 11/00; H04B 7/00
(52) U.S. Cl. .................. 714/746; 455/517; 714/701
(58) Field of Search .................. 455/517, 524, 455/500, 507, 509, 510, 515, 518, 521, 525; 714/702, 746, 748, 751, 3, 4, 49, 52, 701; 380/270; 713/160, 161, 189, 190

(56) References Cited

U.S. PATENT DOCUMENTS

| | | | |
|---|---|---|---|
| 5,802,468 A | * | 9/1998 | Gallant et al. .............. 455/422 |
| 6,115,611 A | * | 9/2000 | Kimoto et al. .............. 455/422 |
| 6,188,882 B1 | * | 2/2001 | Tarkiainen et al. ......... 455/404 |
| 6,202,188 B1 | * | 3/2001 | Suzuki et al. ............... 714/758 |
| 6,349,200 B1 | * | 2/2002 | Sabat et al. ................. 370/338 |

FOREIGN PATENT DOCUMENTS

| | | |
|---|---|---|
| AU | B-26110-95 | 5/1998 |
| DE | 44 22 015 | 8/1995 |
| EP | 0 810 803 | 12/1997 |
| JP | 7-162834 | 6/1995 |
| JP | 8-140067 | 5/1996 |
| JP | 10-153440 | 6/1998 |
| WO | 88/09104 | 11/1988 |
| WO | 95/12933 | 5/1995 |
| WO | 95/24808 | 9/1995 |
| WO | 95/28810 | 10/1995 |
| WO | 96/34493 | 10/1996 |
| WO | 96/36141 | 11/1996 |
| WO | 97/39540 | 10/1997 |

* cited by examiner

*Primary Examiner*—Christine T. Tu
(74) *Attorney, Agent, or Firm*—Wenderoth, Lind & Ponack, L.L.P.

(57) ABSTRACT

The present invention provides a digital data transmitting/ receiving method, a base station unit, and a mobile object terminal unit, which enable collection of information desired by the mobile object terminal among service information distributed by the base station by using a broadcasting channel. The base station transmits data after identification information is added in the header information of the service information provided to the mobile object terminal, and the mobile object terminal has an address showing the identification information. The mobile object terminal analyzes the identification information by indicating the address to identify whether the service information is provided to the terminal.

10 Claims, 14 Drawing Sheets

Fig.3

| area identification part | | car type identification part | | | car identification part | user identification part | |
|---|---|---|---|---|---|---|---|
| countries | prefectures | municipalities | car manufacturer | car type | year model | license plate | termical ID | user ID |

Fig.4

| Country Code | Prefecture Code | Municipality Code | Car Manufacturer | User ID |
|---|---|---|---|---|
| 1 Japan<br>2 Argentina<br>3 Croatia<br>......<br>10 China<br>...... | 1 Hokkaido<br>2 Aomori<br>3 Akita<br>......<br>10 Osaka<br>...... | 1 ○○○<br>2 △△△<br>3 ×××<br>......<br>10 □□□ | 1 SUBARU<br>2 DAIHATSU<br>3 SUZUKI<br>......<br>10 HONDA<br>...... | 1<br>2<br>3<br>......<br>10<br>...... |

Fig.5 (a) identification information
part of address header information

| area identification part | car type identification part | car identification part | user identification part |
|---|---|---|---|
| 10110111 | 11100101 | 1001101101 | 11011011 |

Fig.5 (b) masking example 1
transmitting repair information to broken-down cars

| area identification part | car type identification part | car identification part | user identification part |
|---|---|---|---|
| 00000000 | 11100101 | 1001101101 | 00000000 | masking of address header information ← effective identification information → masking Fig.5 (c) masking example 2
transmitting recall information

| area identification part | car type identification part | car identification part | user identification part |
|---|---|---|---|
| 00000000 | 11100101 | 0000000000 | 00000000 | masking of address header information ← effective identification information → masking Fig.6 (a)
Fig.6 (b)
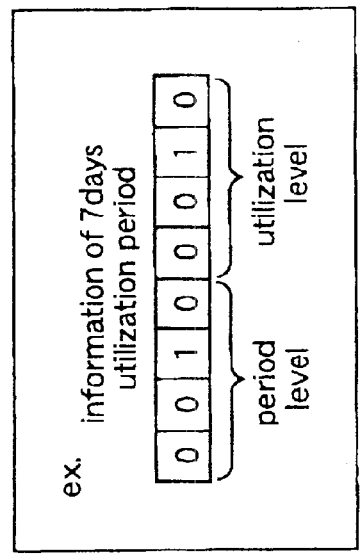
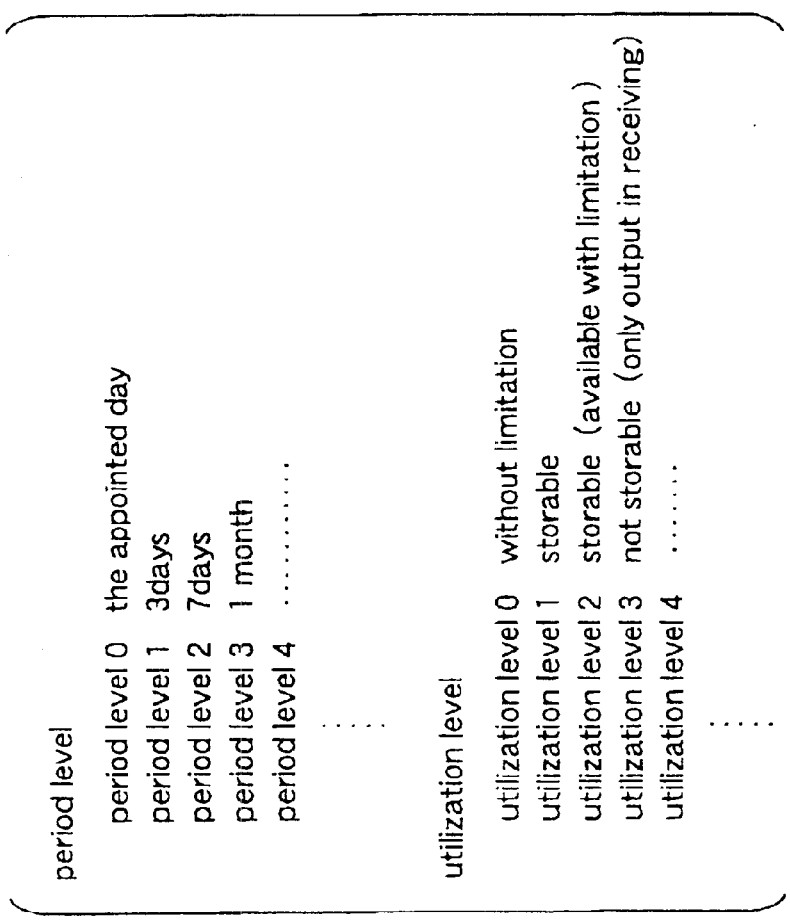

Fig.9

| transmission destination | transmission target terminal address |
|---|---|
| addresser informaiton | addresser address |
| confidentiality | presence of encipherment, designation of enciphering method |
| redundancy | designation of redundancy in encoding |
| transmission frequency, time | transmission time zone, frequency |
| access frequency | presence of same request |
| communication quality | data quality |
| accounting method | designation of accounting method |
| receiving method | mobile receiving/fixed receiving |
| request | designation of desired data |

DIGITAL DATA TRANSMITTING/RECEIVING METHOD, BASE STATION UNIT USED FOR TRANSMITTING/RECEIVING DIGITAL DATA, AND MOBILE OBJECT TERMINAL UNIT USED FOR TRANSMITTING/RECEIVING DIGITAL DATA

FIELD OF THE INVENTION

The present invention relates to a technology for transmitting/receiving digital data between a base station and a mobile object terminal, and more particularly, to a digital data transmitting/receiving method, a base station unit used for transmitting/receiving digital data, and a mobile object terminal unit used for transmitting/receiving digital data, which enable collection of information desired by the mobile object terminal among service information distributed from the base station.

BACKGROUND OF THE INVENTION

As a digital data transmitting/receiving technology in the broadcasting by a communication satellite (CS) or a broadcasting satellite (BS) and the ground wave digital broadcasting, service information is distributed from a base station (broadcasting station) to mobile object terminals existing in a service area thereof, by using a prescribed broadcasting channel.

In addition, Japanese Published Patent Application No. Hei.7-154350 discloses a multiplex broadcasting method in which multiplex data is broadcast after area codes such as zip codes are attached to the multiplex data on the broadcasting station side to restrict broadcasting target areas of area information such as commercials closely related to areas, an area code of an installation area of a multiplex broadcasting receiver is registered as ID of the receiver in a memory on the receiver side, the area code of the received multiplex data which is separated by a data extracting circuit and ID in the memory are compared with each other, and only when they are judged to coincide with each other, a picture image corresponding to the multiplex data is displayed on an image receiver.

However, in the prior art digital data transmitting/receiving method, since the base station distributes various kinds of service information by using a prescribed broadcasting channel, it is difficult for the mobile object terminal which is provided with the service information to collect only information which the mobile object terminal really needs among the various kinds of service information.

In the multiplex broadcasting method which restricts the areas, as disclosed in Japanese Published Patent Application No. Hei. 7-154350, it is impossible to collect only the information desired by a user, neither.

SUMMARY OF THE INVENTION

The present invention is made to solve the above-mentioned problem, and an object of the present invention is to provide a digital data transmitting/receiving method, a base station unit used for transmitting/receiving digital data, and a mobile object terminal unit used for transmitting/receiving digital data, which enable collection of information desired by the mobile object terminal among service information distributed by the base station.

Other objects and advantages of the invention will become apparent from the detailed description that follows. The detailed description and specific embodiments described are provided only for illustration since various additions and modifications within the spirit and the scope of the invention will be apparent to those skill in the art from the detailed description.

According to a 1st aspect of the present invention, there is provided a method for transmitting/receiving digital data between a base station established on the ground and a mobile object terminal installed on a mobile object existing in a service area, wherein the base station provides service information to the mobile object terminal by digital communication by using a broadcasting channel; the base station transmits the data after identification information is added in header information of the service information which is provided to the mobile object terminal; and the mobile object terminal has an address showing the identification information, analyzes the identification information by indicating the address, and enables to identify whether the service information is provided to the mobile object terminal itself Therefore, the mobile object terminal as a user can collect only desired information among the service information which is provided by the prescribed broadcasting channel, by indicating the address showing the identification information.

According to a 2nd aspect of the present invention, in the digital data transmitting/receiving method according to the 1st aspect, the identification information includes an area identification part and a vehicle identification part. Therefore, the mobile object terminal as a user can collect only desired information among the service information which is provided by the prescribed broadcasting channel, by indicating the address showing the identification information.

According to a 3rd aspect of the present invention, in the digital data transmitting/receiving method according to the 1st aspect, the identification information includes an area identification part and a user identification part. Therefore, the mobile object terminal as a user can collect only desired information among the service information which is provided by the prescribed broadcasting channel, by indicating the address showing the identification information.

According to a 4th aspect of the present invention, in the digital data transmitting/receiving method according to the 1st aspect, the identification information includes a vehicle type identification part and a vehicle identification part. Therefore, the mobile object terminal as a user can collect only desired information among the service information which is provided by the prescribed broadcasting channel, by indicating the address showing the identification information.

According to a 5th aspect of the present invention, in the digital data transmitting/receiving method according to the 1st aspect, the identification information includes an area identification part, a vehicle type identification part, a vehicle identification part, and a user identification part. Therefore, the mobile object terminal as a user can collect only desired information among the service information which is provided by the prescribed broadcasting channel, by indicating the address showing the identification information.

According to a 6th aspect of the present invention, in the digital data transmitting/receiving method according to any of the 2nd, 3rd, and 5th aspects, the area identification part includes a code representing a country, a prefecture, or a municipality. Therefore, the mobile object terminal as a user can collect only desired information among the service information which is provided by the prescribed broadcasting channel, by indicating the address showing the identification information.

According to a 7th aspect of the present invention, in the digital data transmitting/receiving method according to any of the 4th and 5th aspects, the vehicle type identification part includes a code representing a vehicle manufacturer, a vehicle type, or a vehicle year model. Therefore, the mobile object terminal as a user can collect only desired information among the service information which is provided by the prescribed broadcasting channel, by indicating the address showing the identification information.

According to an 8th aspect of the present invention, in the digital data transmitting/receiving method according to any of the 2nd, 4th, and 5th aspects, the vehicle identification part includes a code representing license plate information. Therefore, the mobile object terminal as a user can collect only desired information among the service information which is provided by the prescribed broadcasting channel, by indicating the address showing the identification information.

According to a 9th aspect of the present invention, in the digital data transmitting/receiving method according to any of the 3rd and 5th aspects, the user identification part includes a code representing a terminal ID or a user ID. Therefore, the mobile object terminal as a user can collect only desired information among the service information which is provided by the prescribed broadcasting channel, by indicating the address showing the identification information.

According to a 10th aspect of the present invention, in the digital data transmitting/receiving method according to the 1st aspect, the base station transmits data after permission information is further added in header information of the service information which is provided to the mobile object terminal; and the mobile object terminal analyzes the permission information and receives the service information in accordance with handling level of the service information provided to the terminal itself. Therefore, the mobile object terminal can receive the service information in accordance with the utilization manner such that only using of the service information is possible, or using and storing of the service information is possible.

According to an 11th aspect of the present invention, in the digital data transmitting/receiving method according to the 10th aspect, the permission information specifies a utilization manner of the service information which is received by the mobile object terminal. Therefore, the mobile object terminal can receive the service information in accordance with the utilization manner such that only using of the service information is possible, or using and storing of the service information is possible.

According to a 12th aspect of the present invention, in the digital data transmitting/receiving method according to the 1st aspect, the base station transmits the data after masking part of the identification information and gives receiving permission of the service information to a particular mobile object terminal group. Therefore, the service information can be provided to only the mobile object terminals belonging to the same category, and the necessary information such as area information limited to particular areas, repair information limited to broken-down cars, recall information limited to particular car types can be provided only to requiring users.

According to a 13th aspect of the present invention, in the digital data transmitting/receiving method according to the 1st aspect, the base station transmits the data after the data recognition information related to the service information is further added in the header information of the service information which is provided to the mobile object terminal; and the mobile object terminal analyzes the data recognition information and enables collection of necessary information among the service information which is provided to the terminal itself Therefore, only the necessary information can be collected by grasping the contents of the data.

According to a 14th aspect of the present invention, in the digital data transmitting/receiving method according to the 13th aspect, the data recognition information is point information; and the mobile object terminal enables collection of service information related to an arbitrary point or area by using the point information. Therefore, the mobile object terminal can collect the service information related to an arbitrary point or area.

According to a 15th aspect of the present invention, in the digital data transmitting/receiving method according to the 13th aspect, the data recognition information is division information of the service information; and the mobile object terminal analyzes the division information and stands by (i.e., delays) data reproduction processing until all data gather. Therefore, only the necessary information can be collected by grasping the contents of the data.

According to a 16th aspect of the present invention, in the digital data transmitting/receiving method according to the 13th aspect, the data recognition information is partly available information of the service information; and the mobile object terminal analyzes the partly available information and performs data processing even when part of the service information is lacking. Therefore, only the necessary information can be collected by grasping the contents of the data.

According to a 17th aspect of the present invention, in the digital data transmitting/receiving method according to the 13th aspect, the data recognition information is information indicating a plurality of service information are included; and the mobile object terminal analyzes the data recognition information and performs data ocessing after performing separation processing of the service information. Therefore, only the necessary information can be collected by grasping the contents of the data.

According to an 18th aspect of the present invention, in the digital data transmitting/receiving method according to the 1st aspect, the identification information is an address of a particular mobile object terminal. Therefore, the one-to-one communication via the base station can be possible and it is possible to exchange personal messages.

According to a 19th aspect of the present invention, in the digital data transmitting/receiving method according to the 1st aspect, the identification information is a transmission source address and a transmission destination address in the mobile object terminal. Therefore, the one-to-one communication via the base station can be possible and it is possible to exchange personal messages.

According to a 20th aspect of the present invention, in the digital data transmitting/receiving method according to the 19th aspect, the transmission source address is an address of a mobile object terminal which transmits information to the base station; and the transmission destination address is an address of another mobile object terminal specified by the mobile object terminal which transmits information to the base station. Therefore, the one-to-one communication via the base station can be possible and it is possible to exchange personal messages.

According to a 21st aspect of the present invention, in the digital data transmitting/receiving method according to the 19th aspect, the mobile object terminal can set receiving refusal of the service information which is provided from a particular transmission source address on the basis of the transmission source address. Therefore, each mobile object terminal can refuse unnecessary information for itself.

According to a 22nd aspect of the present invention, in the digital data transmitting/receiving method according to the 1st aspect, the mobile object terminal transmits request information including an address assigned to itself, to the base station, and the base station transmits service information corresponding to the request information. Therefore, it is possible to receive necessary service information in accordance with the request of the mobile object terminal at a requested time and in a requested form.

According to a 23rd aspect of the present invention, in the digital data transmitting/receiving method according to the 22nd aspect, the request information includes confidential information instructing encipherment of service information to be provided. Therefore, it is possible to receive necessary service information in accordance with the request of the mobile object terminal at a requested time and in a requested form.

According to a 24th aspect of the present invention, in the digital data transmitting/receiving method according to the 22nd aspect, the request information includes information indicating information amount of voice data in requesting transmission of the voice data. Therefore, it is possible to receive necessary service information in accordance with the request of the mobile object terminal at a requested time and in a requested form.

According to a 25th aspect of the present invention, in the digital data transmitting/receiving method according to the 22nd aspect, the request information includes information indicating information amount of image data in requesting transmission of the image data. Therefore, it is possible to receive necessary service information in accordance with the request of the mobile object terminal at a requested time and in a requested form.

According to a 26th aspect of the present invention, in the digital data transmitting/receiving method according to the 22nd aspect, the request information includes information indicating transmission time and a transmission frequency of the service information. Therefore, it is possible to receive necessary service information in accordance with the request of the mobile object terminal at a requested time and in a requested form.

According to a 27th aspect of the present invention, in the digital data transmitting/receiving method according to the $22^{nd}$ aspect, the request information includes information instructing to transmit as a data construction for a mobile object. Therefore, it is possible to receive necessary service information in accordance with the request of the mobile object terminal at a requested time and in a requested form.

According to a 28th aspect of the present invention, there is provided a method for transmitting/receiving digital data between a base station established on the ground and a mobile object terminal installed on a mobile object existing in a service area, wherein the base station provides service information to the mobile object terminal by digital communication using a broadcasting channel; the base station divides transmission data into plural division files after adding header information to service information, creates transmission files by adding error correction marks to the division files, creates transmission packets by further dividing the transmission files into plural pieces, and transmits to the mobile object terminal a transmission packet sequence which is generated by connecting the transmission packets, and the mobile object terminal creates reception files from a received reception packet sequence, creates division files after correcting reception errors by utilizing the error correction marks included in the reception files, and restores data before transmission which is constituted by a header part and a data part from the division file sequence. Therefore, it is possible to restore data based on the normal division files without reception errors even when a part of the division files cannot be restored because of reception errors, etc., and to securely receive the service information even when the receiving environment of the mobile object terminal is comparatively bad.

According to a 29th aspect of the present invention, in the digital data transmitting/receiving method according to the 1st aspect, the base station divides transmission data into plural division files after adding header information to service information, creates transmission files by adding error correction marks to the division files, creates transmission packets by further dividing the transmission files into plural pieces, and transmits to the mobile object terminal a transmission packet sequence which is generated by connecting the transmission packets, and the mobile object terminal creates reception files from a received reception packet sequence, creates division files after correcting a reception error by utilizing error correction marks included in the reception files, and restores data before transmission which is constituted by a header part and a data part from the division file sequence. Therefore, it is possible to restore data based on the normal division files without reception errors even when a part of the division files cannot be restored because of reception errors, etc., and to securely receive the service information even when the receiving environment of the mobile object terminal is comparatively bad.

According to a 30th aspect of the present invention, in the digital data transmitting/receiving method according to the 28th aspect, highly significant files are copied and the copied files are added to the division files. Therefore, it is possible to restore data avoiding data lacking in the part of highly significant information such as header information.

According to a 31st aspect of the present invention, in the digital data transmitting receiving method according to the 28th aspect, the division files are created by rearranging the order of divided transmission data and locating the same at random. Therefore, it is possible to reduce an error occurring rate for data such as moving pictures where errors are apt to continue to occur.

According to the 32nd aspect of the present invention, in the digital data transmitting/receiving method according to the 28th aspect, even when division files include errors, the mobile object terminal restores data by utilizing the other division files including no error. Therefore, it is possible to restore data based on the normal division files without reception errors even when a part of the division files cannot be restored because of reception errors, etc., and to securely receive the service information even when the receiving environment of the mobile object terminal is comparatively bad.

According to a 33rd aspect of the present invention, there is provided a base station unit used for transmitting/ receiving digital data between a base station established on the ground and a mobile object terminal installed on a mobile object existing in a service area, wherein the base station provides service information to the mobile object terminal by digital communication by using a broadcasting channel, comprising: a data transmitting means for transmitting service information to the mobile object terminal by the digital communication by using the broadcasting channel; a service information data base holding various kinds of service information which are provided to the mobile object terminal; and a data generating means for generating service information which is transmitted by the data transmitting means, by adding header, information including identification information to data which is read out from the service information data base. Therefore, the mobile object terminal as a user can collect only desired information among the service information which is provided by the prescribed broadcasting channel, by indicating the address showing the identification information.

According to a 34th aspect of the present invention, in the base station unit used for transmitting/receiving digital data according to the 33rd aspect, the identification information includes an area identification part and a vehicle identification part. Therefore, the mobile object terminal as a user can collect only desired information among the service information which is provided by the prescribed broadcasting channel, by indicating the address showing the identification information.

According to a 35th aspect of the present invention, in the base station unit used for transmitting/receiving digital data according to the 33rd aspect, the identification information includes an area identification part and a user identification part. Therefore, the mobile object terminal as a user can collect only desired information among the service information which is provided by the prescribed broadcasting channel, by indicating the address showing the identification information.

According to a 36th aspect of the present invention, in the base station unit used for transmitting/receiving digital data according to the 33rd aspect, the identification information includes a vehicle type identification part and a vehicle identification part. Therefore, the mobile object terminal as a user can collect only desired information among the service information which is provided by the prescribed broadcasting channel, by indicating the address showing the identification information.

According to a 37th aspect of the present invention, in the base station unit used for transmitting/receiving digital data according to the 33rd aspect, the identification information includes an area identification part, a vehicle type identification part, a vehicle identification part, and a user identification part. Therefore, the mobile object terminal as a user can collect only desired information among the service information which is provided by the prescribed broadcasting channel, by indicating the address showing the identification information.

According to a 38th aspect of the present invention, in the base station unit used for transmitting/receiving digital data according to the 33rd aspect, the data generating means comprises a permission information adding means for adding permission information which indicates handling level of the service information in the mobile object terminal, in header information of the service information provided to the mobile object terminal. Therefore, the mobile object terminal can receive the service information in accordance with the utilization manner such that only using of the service information is possible, or using and storing of the service information is possible.

According to a 39th aspect of the present invention, in the base station unit used for transmitting/receiving digital data according to the 33rd aspect, the data generating means comprises a masking processing means for masking part of the identification information so as to give receiving permission of the service information to a particular mobile object terminal group. Therefore, the service information can be provided to only the mobile object terminals belonging to the same category, and the necessary information such as area information, limited to particular areas, repair information limited to broken-down cars, recall information limited to particular car types can be provided to requiring users.

According to a 40th aspect of the present invention, in the base station unit used for transmitting/receiving digital data according to the 33rd aspect, the data generating means comprises a data recognition information adding means for adding, in header information of the service information provided to the mobile object terminal, data recognition information which allows the mobile object terminal to collect necessary information among the provided service information. Therefore, only the necessary information can be collected by grasping the contents of the data, for example, when the data recognition information is supposed to be point information, the mobile object terminal can collect the service information related to an arbitrary point or area.

According to a 41st aspect of the present invention, in the base station unit used for transmitting/receiving digital data according to the 33rd aspect, the identification information is an address of a particular mobile object terminal. Therefore, the one-to-one communication via the base station can be possible and it is possible to exchange personal messages.

According to a 42nd aspect of the present invention, in the base station unit used for transmitting/receiving digital data according to the 33rd aspect, the identification information is a transmission source address and a transmission destination address in the mobile object terminal Therefore, the one-to-one communication via the base station can be possible and it is possible to exchange personal messages.

According to a 43rd aspect of the present invention, the base station unit used for transmitting/receiving digital data according to the 33rd aspect comprises: a request information searching means for receiving request information including an address assigned to the mobile object terminal, and the data generation means for generating service information by reading out data in accordance with the request information from service information data base. Therefore, it is possible to receive necessary service information in accordance with the request of the mobile object terminal at a requested time and in a requested form.

According to a 44th aspect of the present invention, there is provided a base station unit used for transmitting/receiving digital data between a base station established on the ground and a mobile object terminal installed on a mobile object existing in a service area, wherein the base station provides service information to the mobile object terminal by digital communication using a broadcasting channel, comprising: a data transmitting means for transmitting service information to the mobile object terminal by digital communication using a broadcasting channel, a service information data base holding various kinds of service information which is provided to the mobile object terminal, and a data generating means for dividing transmission data into plural division files after adding header information to data which is read out from the service information data base, creating transmission files by adding error correction marks to the division files, creating transmission packets by further dividing the transmission files into plural pieces, and generating a transmission packet sequence by connecting the transmission packets. Therefore, it is possible to restore data based on the normal division files without reception errors even when a part of the division files cannot be restored because of reception errors, etc., and to securely receive the service information even when the receiving environment of the mobile object terminal is comparatively bad.

According to a 45th aspect, the base station unit used for transmitting/receiving digital data according to the 33rd aspect comprises: a data transmission means for transmitting service information to the mobile object terminal by digital communication using a broadcasting channel, a service information data base holding various kinds of service information which is provided to the mobile object terminal, and a data generating means for dividing transmission data into plural division files after adding header information to data which is read out from the service information data base, creating transmission files by adding error correction marks to the division files, creating transmission packets by further dividing the transmission files into plural pieces, and generating a transmission packet sequence by connecting the transmission packets. Therefore, it is possible to restore data based on the normal division files without reception errors even when a part of the division files cannot be restored because of reception errors, etc., and to securely receive the service information even when the receiving environment of the mobile object terminal is comparatively bad.

According to a 46th aspect of the present invention, in the base station unit used for transmitting/receiving digital data according to the 44th aspect, the data generating means copies highly significant files and adds the copied files to the division files. Therefore, it is possible to restore data avoiding data lacking in the part of highly significant information such as header information.

According to a 47th aspect of the present invention, in the base station unit used for transmitting/receiving digital data according to the 44th aspect, the data generating means rearranges the order of divided transmission files and locates the same at random in the divided files. Therefore, it is possible to reduce an error occurring rate for data such as moving pictures where errors are apt to continue to occur.

According to a 48th aspect of the present invention, there is provided a mobile object terminal unit used for transmitting/receiving digital data between a base station established on the ground and a mobile object terminal installed on a mobile object existing in a service area, wherein the base station provides service information to the mobile object terminal by digital communication by using a broadcasting channel, comprising: a data receiving means for receiving the service information which is transmitted by the base station; a data output means for performing data reproduction processing of the service information which is received by the data receiving means; and a data recognition means for analyzing identification information which is added to header information of service information received by the data receiving means and identifying whether the service information is provided to the terminal itself. Therefore, the mobile object terminal as a user can collect only desired information among the service information which is provided by the prescribed broadcasting channel, by indicating the address showing the identification information.

According to a 49th aspect of the present invention, in the mobile object terminal unit used for transmitting/receiving digital data according to the 48th aspect, the identification information includes an area identification part and a vehicle identification part. Therefore, the mobile object terminal as a user can collect only desired information among the service information which is provided by the prescribed broadcasting channel, by indicating the address showing the identification information.

According to a 50th aspect of the present invention, in the mobile object terminal unit used for transmitting/receiving digital data according to the 48th aspect, the identification information includes an area identification part and a user identification part. Therefore, the mobile object terminal as a user can collect only desired information among the service information which is provided by the prescribed broadcasting channel, by indicating the address showing the identification information.

According to a 51st aspect of the present invention, in the mobile object terminal unit used for transmitting/receiving digital data according to the 48th aspect, the identification information includes a vehicle type identification part and a vehicle identification part. Therefore, the mobile object terminal as a user can collect only desired information among the service information which is provided by the prescribed broadcasting channel, by indicating the address showing the identification information.

According to a 52nd aspect of the present invention, in the mobile object terminal unit used for transmitting/receiving digital data according to the 48th aspect, the identification information includes an area identification part, a vehicle type identification part, a vehicle identification part, and a user identification part. Therefore, the mobile object terminal as a user can collect only desired information among the service information which is provided by the prescribed broadcasting channel, by indicating the address showing the identification information.

According to a 53rd aspect of the present invention, in the mobile object terminal unit used for transmitting/receiving digital data according to the 48th aspect, the base station transmits the data after permission information is further added in header information of the service information which is provided to the mobile object terminal; and the data recognition means analyzes the permission information which is added in the header information of the service information by the base station and enables to recognize handling level of the service information provided to the terminal itself. Therefore, the mobile object terminal can receive the service information in accordance with the utilization manner such that only using of the service information is possible, or using and storing of the service information is possible.

According to a 54th aspect of the present invention, in the mobile object terminal unit used for transmitting/receiving digital data according to the 48th aspect, when the base station transmits the data after masking part of the identification information, the data recognition means does not analyze the masked part of the identification information of the service information. Therefore, the service information can be provided to only the mobile object terminals belonging to the same category, and the necessary information such as area information limited to particular areas, repair information limited to broken-down cars, recall information limited to particular car types can be provided to requiring users.

According to a 55th aspect of the present invention, in the mobile object terminal unit used for transmitting/receiving digital data according to the 48th aspect, the data recognition means analyzes data recognition information which is added in the header information of the service information by the base station and enables collection of necessary information among the service information which is provided to the terminal. Therefore, only the necessary information can be collected by grasping the contents of the data, for example, when the data recognition information is supposed to be point information, the mobile object terminal can collect the service information related to an arbitrary point or area.

According to a 56th aspect of the present invention, in the mobile object terminal unit used for transmitting/receiving digital data according to the 48th aspect, the identification information is an address of a particular mobile object terminal. Therefore, the one-to-one communication via the base station can be possible and it is possible to exchange personal messages.

According to a 57th aspect of the present invention, in the mobile object terminal unit used for transmitting/receiving digital data according to the 48th aspect, the identification information is a transmission source address and a transmission destination address in the mobile object terminal. Therefore, the one-to-one communication via the base station can be possible and it is possible to exchange personal messages.

According to a 58th aspect of the present invention, in the mobile object terminal unit used for transmitting/receiving digital data according to the 57th aspect, the data recognition means enables to set receiving refusal of the service information which is provided from a particular transmission source address on the basis of the transmission source address. Therefore, each mobile object terminal can refuse unnecessary information for itself.

According to a 59th aspect of the present invention, the mobile object terminal used for transmitting/receiving digital data according to the 48th aspect, comprises: a communication means for transmitting to the base station the request information including an address assigned to the mobile object terminal itself. Therefore, it is possible to receive necessary service information in accordance with the request of the mobile object terminal at a requested time and in a requested form.

According to a 60th aspect of the present invention, in the mobile object terminal used for transmitting/receiving digital data according to the 48th aspect, the request information includes confidential information instructing encipherment of service information to be provided. Therefore, it is possible to receive necessary service information in accordance with the request of the mobile object terminal at a requested time and in a requested form.

According to a 61st aspect of the present invention, in the mobile object terminal used for transmitting/receiving digital data according to the 48th aspect, the request information includes information instructing information amount of voice data in requesting transmission of voice data. Therefore, it is possible to receive necessary service information in accordance with the request of the mobile object terminal at a requested time and in a requested form.

According to a 62nd aspect of the present invention, in the mobile object terminal used for transmitting/receiving digital data according to the 48th aspect, the request information includes information instructing information amount of image data in requesting transmission of picture data. Therefore, it is possible to receive necessary service information in accordance with the request of the mobile object terminal at a requested time and in a requested form.

According to a 63rd aspect of the present invention, in the mobile object terminal used for transmitting/receiving digital data according to the 48th aspect, the request information includes information instructing transmission time and transmission frequencies of service information. Therefore, it is possible to receive necessary service information in accordance with the request of the mobile object terminal at a requested time and in a requested form.

According to a 64th aspect of the present invention, in the mobile object terminal used for transmitting/receiving digital data according to the 48th aspect, the request information includes information instructing to transmit as a data structure for a mobile object. Therefore, it is possible to receive necessary service information in accordance with the request of the mobile object terminal at a requested time and in a requested form.

According to a 65th aspect, there is provided a mobile object terminal used for transmitting/receiving digital data between a base station established on the ground and a mobile object terminal installed on a mobile object existing in a service area, wherein the base station provides service information to the mobile object terminal by digital communication using a broadcasting channel comprising: a data receiving means for receiving service information transmitted from the base station, and a data output means for performing data reproduction processing of service information received by the data receiving means, wherein the service information transmitted from the base station is composed of transmission packets created by dividing transmission data into plural division files after adding header information to the data which is provided to the mobile object terminal, and further dividing the transmission files into plural pieces packets after adding error correction marks to the division files, and comprising: a data recognition means for creating reception files from plural pieces packets received by the receiving means, creating the division files after correcting reception errors of data by utilizing error correction marks included in the reception files, and restoring data before transmission by editing a header part and a data part from the division files. Therefore, it is possible to restore data based on the normal division files without reception errors even when a part of the division files cannot be restored because of reception errors, etc., and to securely receive the service information even when receiving environment of the mobile object terminal is comparatively bad.

According to a 66th aspect of the present invention, the mobile object terminal used for transmitting/receiving digital data according to the 48th aspect comprises: a data receiving means for receiving service information transmitted from the base station, and a data output means for performing data reproduction processing of service information received by the data receiving means, wherein the service information transmitted from the base station is composed of transmission packets created by dividing transmission data into plural division files after adding header information to the data to be provided to the mobile object terminal, and further dividing the transmission files into plural pieces packets after adding error correction marks to the division files, and comprising: a data recognition means for creating reception files from plural pieces packets received by the receiving means, creating the division files after correcting reception errors of data by utilizing the error correction marks included in the reception files, and restoring data before transmitted by editing a header part and a data part from the division files. Therefore, it is possible to restore data based on the normal division files without reception errors even when a part of the division files cannot be restored because of reception errors, etc., and to securely receive the service information even when the receiving environment of the mobile object terminal is comparatively bad.

According to a 67th aspect of the present invention, in the mobile object terminal used for transmitting/receiving digital data according to the 56th aspect, highly significant division files are copied and the copied files are added to the division files. Therefore, it is possible to restore data avoiding data lacking in the part of highly significant information such as header information.

According to a 68th aspect of the present invention, in the a mobile object terminal used for transmitting/receiving digital data according to the 56th aspect, the division files are generated by rearranging the order of divided transmission data and locating the same at random. Therefore, it is possible to reduce an error occurring rate for data such as moving pictures where errors are apt to continue to occur.

According to a 69th aspect of the present invention, in the mobile object terminal used for transmitting/receiving digital data according to the 65th aspect, even when division files include errors, the data recognition means enables to restore data by utilizing the other division files including no error. Therefore, it is possible to restore data based on the normal division files without receiving error even when a part of the division files cannot be restored because of receiving error, etc., and to securely receive service information even when the receiving environment of mobile object terminal is comparatively bad.

BRIEF DESCRIPTION OF THE DRAWINGS

FIG. 3 is a diagram illustrating respective identification units of identification information in the data structure shown in FIG. 2.

FIG. 4 is a diagram showing contents of the respective identification units shown in FIG. 3.

FIGS. 5(a)–5(c) are diagrams showing an example in which masking processing is performed to part of the identification units shown in FIG. 3.

FIGS. 6(a) and 6(b) are diagrams showing contents of permission information in the data structure shown in FIG. 2.

FIG. 9 is a diagram showing contents of request information communicated by a communication means in the mobile object terminal shown in FIG. 8.

DETAILED DESCRIPTION OF THE PREFERRED EMBODIMENTS

Hereinafter, embodiments including a digital data transmitting/receiving method, a base station unit, and a mobile object terminal unit according to the present invention will be described.

Embodiment 1

In a digital data transmitting/receiving system according to the first embodiment, an address including identification information for receiving services is set on a receiving terminal side. On the other hand, a data base (DB) comprising various kinds of service information such as map data, traffic information, route guide information, area information, news, weather forecast, and electronic mails is held on a base station side. By adding header information constituted by identification information which can specify service target users and permission information which sets availability level of data to the service information, data services can be provided to the particular users.

Figure 1:
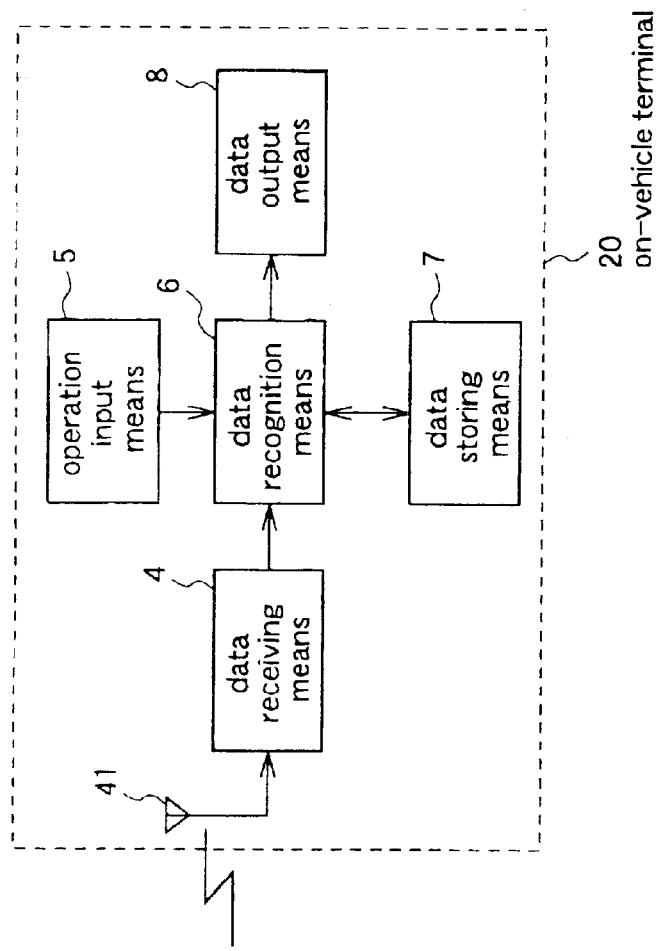
FIGS. 1(a) and 1(b) are block diagrams illustrating structures of a base station unit and a mobile object terminal unit which are used in a digital data transmitting/receiving method according to a first embodiment of the present invention.
Figure 1:
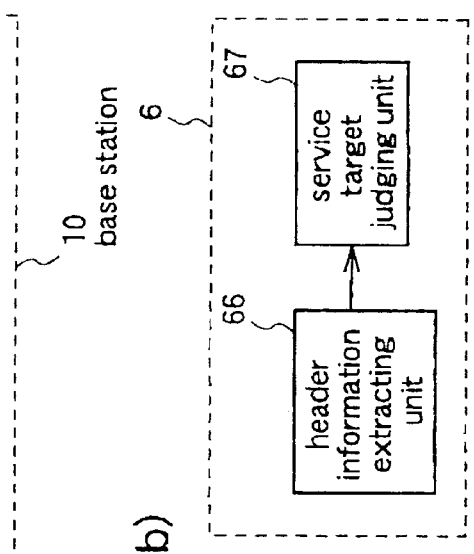

FIG. 1 is a block diagram illustrating structures of a base station unit and a mobile object terminal unit, used for transmitting/receiving digital data according to the first embodiment of the present invention.

In the figure, reference numeral 10 designates a base station unit (hereinafter referred to simply as a base station) established on the ground, and numeral 20 designates a on-vehicle terminal as a mobile object terminal unit which is installed on a mobile object. The system for realizing the digital data transmitting/receiving method according to the first embodiment is constituted by the base station 10, one or more on-vehicle terminals 20, and one or more fixed terminals comprising terminals established on the ground (not shown). In addition, as mobile objects, there are a motorcar, a train, a ship, an airplane, etc., but a motorcar is taken as an example in this first embodiment.

The base station 10 is constituted by a service information DB 1, a data generating means 2, and a data transmitting means 3.

The service information DB 1 is a data base holding various kinds of service information such as map information, traffic information, area information (such as parking spaces, gas stations (GS), restaurants, neighborhood facilities, and events), general information (such as news and weather forecasts), message information (voice, text), live views (still pictures, moving pictures), internet (electronic mails, news, WWW (World Wide Web)), advertisements, and software.

The data generating means 2 extracts the service information having contents to be broadcast from the service information DB 1 and generates data to be transmitted by adding identification information specifying service target users and permission information indicating availability level as header information to the Extracted service information. Details of a structure of the data will be described later with reference to FIGS. 2 to 6.

The data transmitting means 3 digitally transmits the data to be transmitted which is generated by the data generating means 2 from a transmitting antenna 31 to the on-vehicle terminal 20. Here, a broadcasting unit used in ground wave digital broadcasting, satellite digital broadcasting or the like can be used as a communication means in broadcasting.

On the other hand, the on-vehicle terminal 20 is constituted by a data receiving means 4, an operation input means 5, a data recognition means 6, a data storing means 7, and a data output means 8.

The data receiving means 4 is a unit for receiving the data transmitted from the base station 10.

The operation input means 5 is an input unit which is used for operations of deciding whether a broadcasting service is received or not, or selecting a category of desired data. As the operation input means 5, input units such as voice inputting and a remote controller are used.

The data recognition means 6 is constituted by a header information extracting unit 66 and a service target judging unit 67, as shown in FIG. 1(b). The header information extracting unit 66 extracts header information from the received data which is received by the data receiving means 4. The service target judging unit 67 compares an address assigned to the on-vehicle terminal 20 with the identification information included in the header information which is, extracted by the header information extracting unit 66, and judges whether it is the service target data or not, or judges the availability level of the data by checking the permission information, or further judges the contents of the received data by checking the data identification header.

The data storing means 7 is a unit for storing data on the basis of the judgement by the data recognition means 6. The data storing means 7 can be constituted by a recording medium such as a flash memory, a hard disk, and an optical disk. Or it may be constituted as an internal memory of the data recognition means 6.

The data output means 8 outputs data on the basis of the judgement by the data recognition means 6. The data output means 8 is constituted by a display, a speaker or the like.

Figure 2:
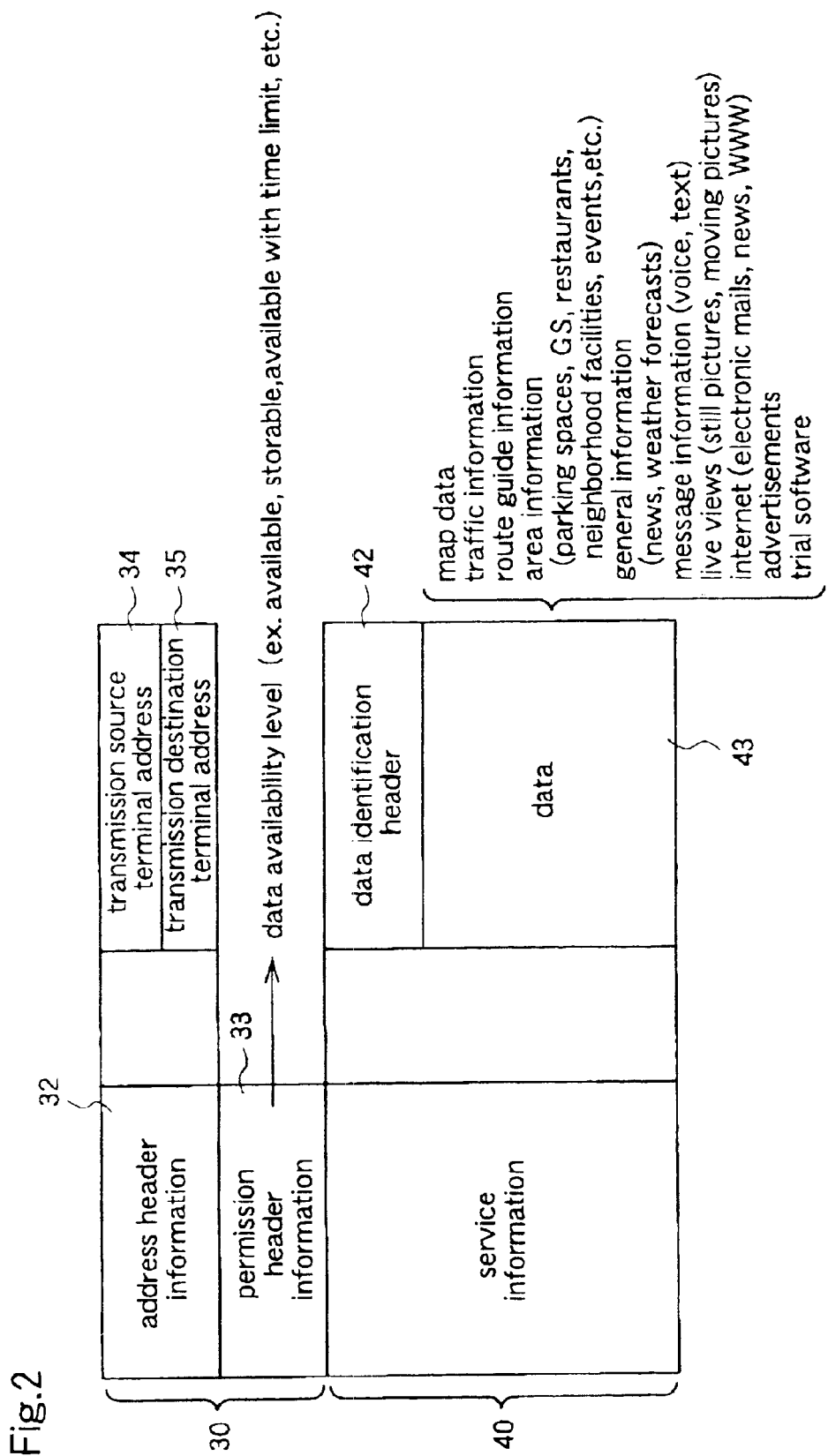
FIG. 2 is a diagram illustrating a data structure used between the base station and the mobile object terminal shown in FIG. 1.

Next, a data structure used in transmitting/receiving digital data according to the first embodiment will be described. FIGS. 2 to 6 are diagrams illustrating the data structure. The data structure used in transmitting/receiving digital data according to the first embodiment is constituted by header information 30 and service information 40 as shown in FIG. 2.

In the first embodiment, the header information 30 is constituted by address header information 32 and permission header information 33.

The address header information 32 is identification information for specifying the on-vehicle terminal 20 as a service target user. Here, the address header information 32 as the identification information is constituted by a transmission source terminal address 34 and a transmission destination terminal address 35 on a receiving terminal. The transmission source terminal address 34 corresponds to an address of a terminal which provides information to the base station 10, and the transmission destination terminal address 35 corresponds to an address of another terminal specified by the terminal which provides the information to the base station 10, for example.

The permission header information 33 is information which sets the availability level of the provided service information in the on-vehicle terminal 20 as the service target user. Here, the availability level means, for example, to permit only to use the provided service information, to permit to store the same in a storing means, or to restrict utilization time limit of the service information.

In addition, in the first embodiment, the service information 40 is constituted by a data identification header 42 and data 43.

The data identification header 42 shows data recognition information for the data 43. The data recognition information is constituted by such as point information, division information, and partly available information. The point information is information which allows the on-vehicle terminal 20 receiving the services to collect data which is related to an arbitrary point or area among the data 43. More specifically, a code number showing map data, traffic information, route guide information, area information (such as parking spaces, gas stations (GS), restaurants, neighborhood facilities, and event information) can be used as the point information. The division information is information showing that the data 43 of the service information 40 comprises a plurality of divided data. Thereby, on tile base station 10, it is possible to transmit service information having a large capacity to the terminal by dividing the same into several pieces. On the terminal, by analyzing the division information, it is possible to temporarily hold the divided data in the storing means until all the data gathers, and to perform data reproducing processing when all the data have gathered. Therefore, the service information having a large capacity can be provided. The partly available information is information which indicates that the reproducing processing can be performed with respect to a data part including no error, even when part of the data 43 includes errors and all of the data 43 cannot be reproduced. Thereby, the terminal can confirm the contents of the data 43 for the time being, or as the case may be, the terminal can obtain the desired information only from the data part including no error. In addition, by using the division information together with the partly available information, even when the provided data 43 comprises divided data and part of the data 43 includes errors which are not reproducible, it is possible for the terminal to grasp at least the summary of the all data by using the data part including no error. In this case, when an error is found at the time all the data gather, the data is corrected and displayed or, the data may be successively displayed in order of receipt.

The data 43 includes data which is really provided to the terminal, and corresponds to various kinds of information such as map information, traffic information, area information (such as parking spaces, gas stations (GS), restaurants, neighborhood facilities, and events), general information (such as news and weather forecasts), message information (voice, text), live views (still pictures, moving pictures), internet (electronic mails, news, WWW (World Wide Web)), advertisements, and software.

While as the identification information included in the address header information 32, the transmission source terminal address 34 and the transmission destination terminal address 35 are shown in FIG. 2, an example of the identification information which is particularly important for the on-vehicle terminal will be described next. FIG. 3 shows an example of a file construction of the identification information included in the address header information 32. As shown in FIG. 3, the file construction of the identification information included in the address header information 32 comprises an area identification part, a car type identification part, a car identification part, and a user identification part. The area identification part is constituted by countries, prefectures, and municipalities. The car type identification part is constituted by car manufacturers, car types, and year models. The car identification part is constituted by license plate information. In addition, the user identification part is constituted by terminal IDs and user IDs.

FIG. 4 is a diagram illustrating an example of a file construction in which the files of the respective identification parts are shown in detail. As shown in the figure, as country codes in the area identification part, numeral 1 is assigned to Japan, numeral 2 is to Argentina, numeral 3 is to Croatia, . . . etc. Similarly, prefecture codes, municipality codes, car manufacturer codes, user IDs and the like are subdivided and coded, respectively.

Next, an example in which part of the identification information is masked to give receiving permission of the service information to a particular on-vehicle terminal group will be described. FIG. 5 is a diagram illustrating a file construction in which part of the identification information is masked. FIG. 5(a) shows the situation where the respective identification parts of the identification information are not masked. The area identification part is assigned a code number of 10110111, the car type identification part is 11100101, the car identification part is 1001101101, and the user identification part is 11011011, respectively. In a masking example 1 for transmitting repair information to broken-down cars, the code numbers of the area identification part and the user identification part are all cleared, as shown in FIG. 5(b). Then, the effective identification information is constituted by the car type identification part and the car identification part, thereby providing information aiming at only particular car types or cars to the on-vehicle terminal 20, resulting in providing the repair information of the broken-down cars for the particular car types or cars.

In a masking example 2 for transmitting recall information with respect to particular car types, the area identification part, the car identification part, and the user identification part are all cleared, as shown in FIG. 5(c). Then, the effective identification information is constituted by the car type identification part, thereby providing the information aiming at only the particular car types to the on-vehicle terminal 20, resulting in providing the recall information for the particular car types.

Next, a concrete example of the permission header information 33 in the data structure as shown in FIG. 2 will be described. FIG. 6 is a diagram illustrating an example of a data construction of the permission header information 33. Here, the permission header information 33 is constituted by a period level and a utilization level, as shown in FIG. 6(a). The period level indicates an available period of the service information, and it can be set as the level 0 indicates the service information can be used only on the appointed day, the level 1 indicates it can be used for 3 days, the level 2 for 7 days, the level 3 for a month, . . . etc. In addition, the utilization level indicates the permission of only using, permission of storing or the like as the utilization manner of the service information. For example, the utilization level can be set as the level 0 indicates the permission of utilization without limitation, the level 1 indicates the permission of storing, the level 2 indicates that the data can be stored and is permitted to be used with the limitation (when the utilization period expires, data cannot be used or data is deleted from the storing unit), the level 3 indicates that the data cannot be stored (the data is permitted only to be output on receiving), . . . etc. These period level and utilization level car be set by setting code numbers as shown in FIG. 6(b).

Next, operations of the base station unit 10 and the on-vehicle terminal 20, which are constructed as above, will be described.

First, to transmit service information from the base station 10, the data generating means 2 in the base station 10 as shown in FIG. 1 reads out prescribed service information from the service information DB 1, and adds header information to this readout service data. As header information, the address header information 32, the permission header information 33, and farther the data identification header 42 as data recognition information of the data 43 is included as shown in FIG. 2. In addition, when the information should be provided to a particular on-vehicle terminal group, part of the identification information is masked as shown in FIG. 5. The transmission data which is generated by the data generating means 2 is transmitted to the data transmitting means 3, and the received transmission data is coded/compressed, as well as being subjected to packetting (multiplexed) by the data transmitting means 3 to be a digital communication signal. A carrier wave is modulated by the digital communication signal and the digital communication signal is superimposed to the carrier wave to be a transmission signal. This transmission signal is transmitted from the transmitting antenna 31 to the on-vehicle terminal 20 by using a broadcasting channel.

Figure 7:
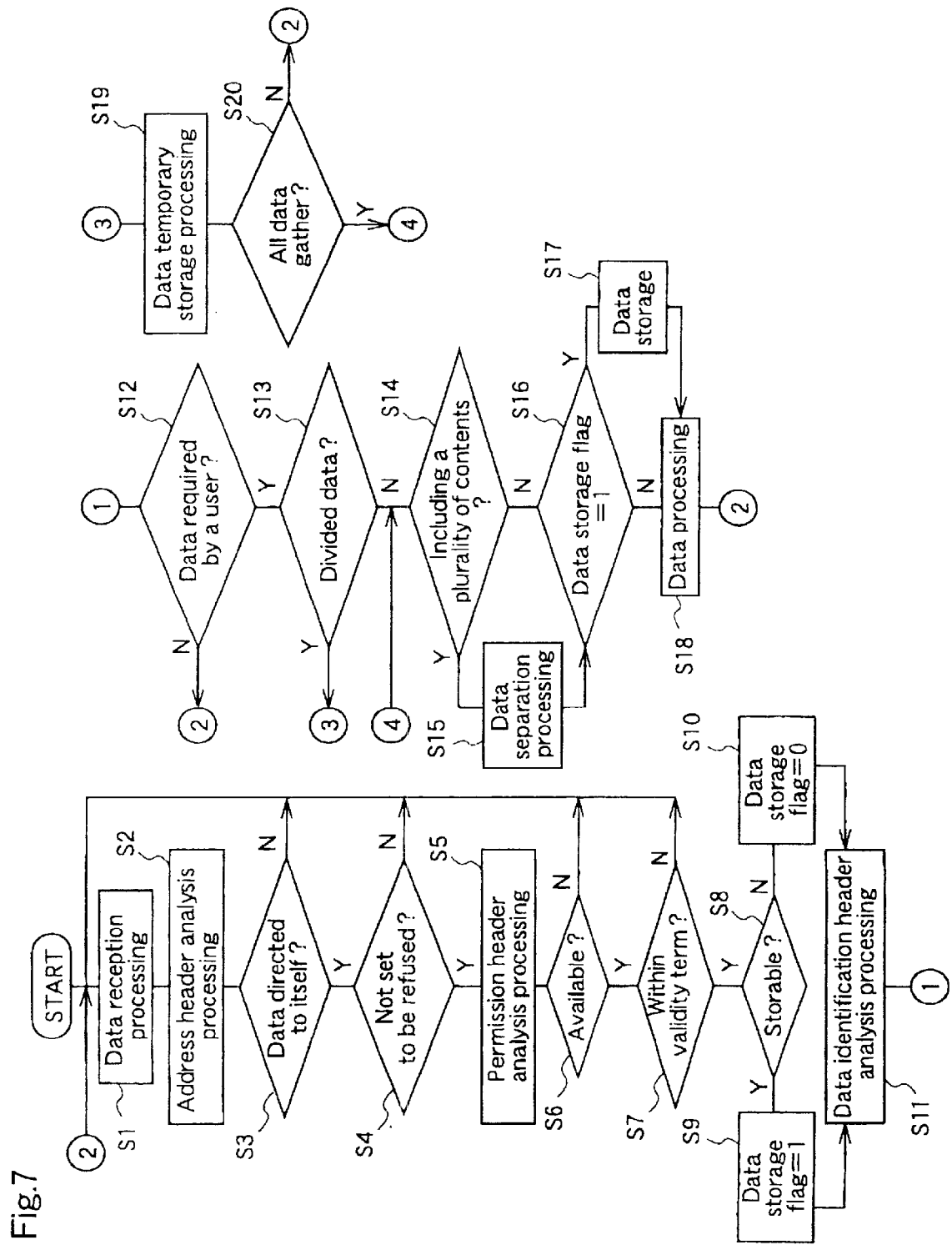
FIG. 7 is a flow chart showing a data processing procedure in a data recognition means in the mobile object terminal shown in FIG. 1.

The data transmitted from the base station unit 10 is received by the receiving antenna 41 which is mounted on the on-vehicle terminal 20 shown in FIG. 1. Hereinafter, the data processing in the on-vehicle terminal 20 will be described with reference to a flowchart shown in FIG. 7. With reference to the figure, reception processing of the data which is received by the receiving antenna 41 is performed in step S1. This data reception processing is performed by the data receiving means 4 and the received transmission signal is demodulated to obtain a digital signal, and the obtained digital signal is separated. Then, after the header information is extracted by the header information extracting unit 66 in the data recognition means 6, the extracted header information is transmitted to the service target judging unit 67. In the service target judging unit 67, the data processing is performed according to following procedures.

First, the analysis processing of the address header information is performed in step S2, and the received data is judged whether it is addressed to itself in step S3. In judging, the terminal address which is assigned to itself in the on-vehicle terminal 20 and the transmission destination terminal address 35 in the address header information 32 are compared with each other. When they coincide with each other, the received data is judged to be the data addressed to the on-vehicle terminal 20 and then processing proceeds to the next step. On the other hand, the terminal address which is assigned to itself and the transmission destination terminal address 35 in the address header information 32 do not coincide with each other, the processing returns before step S1 and stands by until the next data is received.

In step S4, the received data is judged whether it is set to be refused or not. This judgement is performed so as not to perform reproduction processing of data for the information provided from a particular terminal. The transmission source terminal address 34 in the address header information 32 and the address of the terminal which is set to refuse receiving are compared with each other. When they do not coincide with each other, the information is judged that it is information which is not set to be refused receiving, then the processing proceeds to the next step S5. On the other hand, when the transmission source terminal address 34 in the address header information 32 and the address of the terminal which is set to refuse receiving coincide with each other, the processing returns before step S1 and stands by until the next data is received. Here, the address of the terminal which is set to refuse receiving can be input each time from the operation input means 5. Or, the terminal source address which is input by the operation input means 5 may be held in an integral memory of the data recognition means 6 in advance, and be referred to the integral memory in judging refusal setting in step S4.

In step S5, the analysis processing of the permission header information 33 is performed. Then in step S6, it is judged whether the data is permitted to be used or not, and when the data is permitted to be used, the processing goes to the next step S7. When the data is not permitted to be used, the processing returns before step S1 and stands by until the next data is received. Whether the data is permitted to be used or not is judged on the basis of utilization level in the permission header information 33.

In step S7, the term of validity of the data is analyzed, and when it is within the validity term, the processing proceeds to the next step S8. When the validity terms already expires, the processing returns before step S1 and stands by until the next data is received. The validity term of the data is judged on the basis of the period level in the permission header information 33.

In step S8, it is judged whether the storage of data is permitted or not. When the data storage is permitted, a data storage flag is set to 1 in step S9. On the other hand, when the data storage is not permitted, the data storage flag is set to 0 in step S1. The judgement as to whether the data storage is permitted or not is performed on the basis of the utilization level in the permission header information 33.

In step S1, the analysis processing of the data identification header 42 in the service information 40 is performed. By analyzing the data recognition information of the data identification header 42, kinds or contents of the data 43 can be grasped.

Then in step S12, by analyzing the data recognition information of the data identification header 42, the data 43 is judged to be data which is necessary for a user or not. When the data 43 is the data which is necessary for the user, the processing proceeds to the next step S13. When the data 43 is the data which is not necessary for the user, the processing returns before step S1 and stands by until the next data is received.

In step S13, the data recognition information of the data identification header 42 is analyzed, and it is checked whether division information is included in the data recognition information, whereby the data 43 is judged to be divided data or not. Here, when the data 43 is judged not to be the divided data, the processing proceeds to the next step S14. When the data 43 is judged to be the divided data, the processing proceeds to step S19.

In step S19, temporary storage processing of the data 43 is performed and the data 43 is temporarily stored in the data storing means 7.

Then in step S20, it is judged whether all of divided data have been gathered or not, on the basis of the division information included in the data identification header 42. When all the data has been gathered, the processing proceeds to the next step S14, and when all the data has not been gathered yet, the processing returns before step S1 and stands by until the next data is received. Instep 20, when the data identification header 42 includes partly use permitting information of the divided data, even if all the data has not been gathered yet, the processing proceeds to step S1.

In step S14, the data 43 is judged whether it includes a plurality of contents or not from the data recognition information in the data identification header 42. When the data 43 is judged to be the data including a plurality of contents, the processing proceeds to step S15 and the separation processing of the data 43 is performed.

After the data storage flag is set to 1 in step S16, the data 43 is stored by the inner memory of the data recognition means 6, or the data storing means 7 in step S17.

Then in step S18, the reproduction processing of the data 43 which is stored by the inner memory of the data recognition means 6, or the data storing means 7 is performed. By performing the data reproduction processing, reproduced data is output by a display or a speaker in the data output means 8, whereby the user of the on-vehicle terminal 20 can obtain the service information as a picture image or a voice. Here, if the data has a utilization time limit, when the data is within the utilization time limit, the reproduction processing is performed.

According to the first embodiment of the present invention, transmitting/receiving of digital data is realized as described above. Service information which is provided from the base station 10 is transmitted after header information having identification information is added to the service information, and the identification information is analyzed in the on-vehicle terminal 20 receiving the transmitted data, whereby only data required by the terminal itself is received and reproduction processing is realized. Therefore, even if the base station 10 distributes various kinds of service information by using a prescribed broadcasting channel, it is possible for a mobile object terminal which receives service information to collect only information really required by the terminal among these various kinds of service information.

While in the first embodiment, the example in which the identification information comprises an area identification part, a car type identification part, a car identification part, and a user identification part is shown, other identification items can be added. Of course, identification information may be generated by a single or combination of the respective identification parts. Or, data service may be provided to a particular user by generating various patterns of the identification information by masking part of the identification information as shown in FIG. 5.

Embodiment 2

Figure 8:
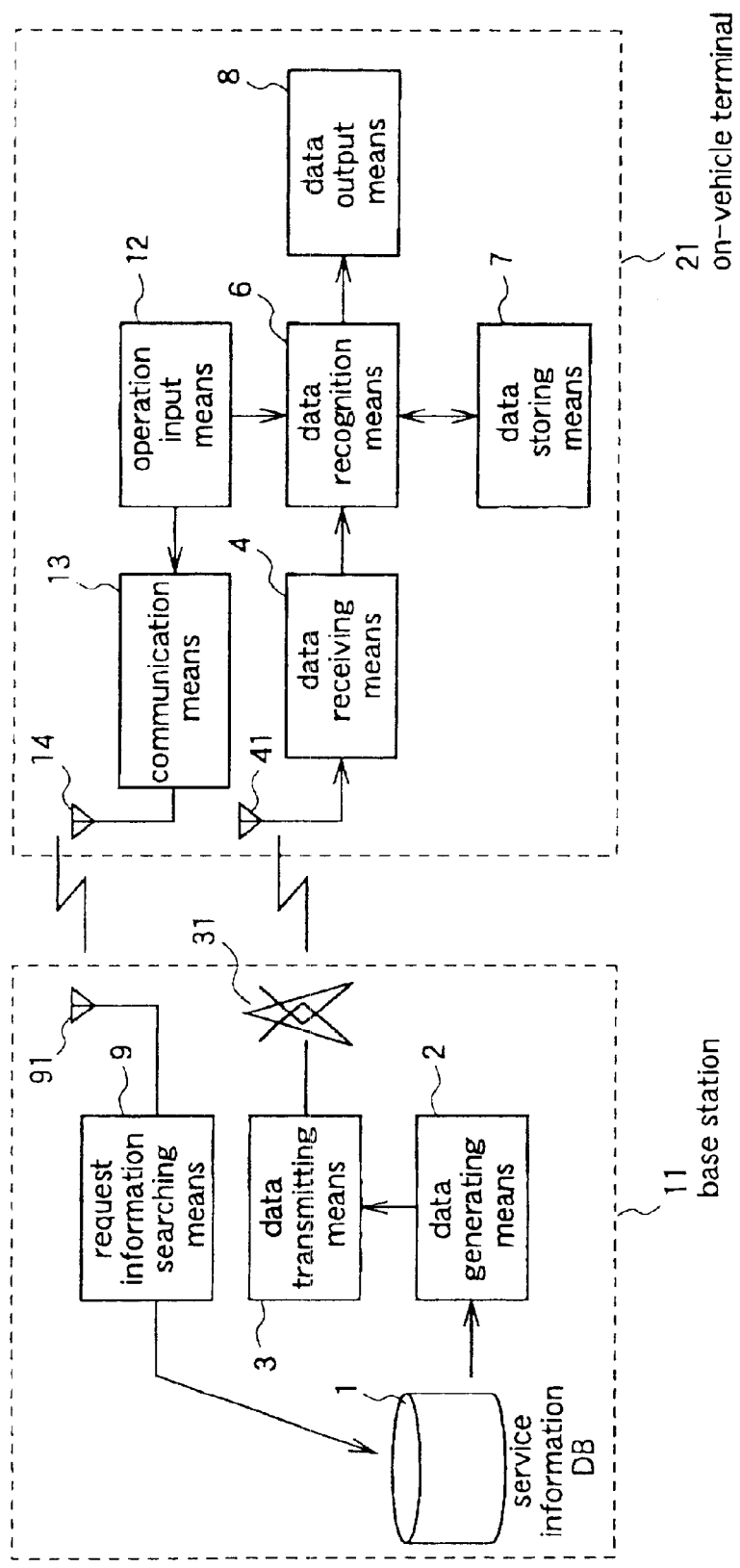
FIG. 8 is a block diagram illustrating structures of a base station unit and a mobile object terminal unit which are used in a digital data transmitting/receiving method according to a second embodiment of the present invention.

FIG. 8 is a block diagram illustrating structures of a base station and an on-vehicle terminal used for transmitting/receiving digital data according to the second embodiment of the present invention. Referring to the figure, an on-vehicle terminal 21 used for transmitting/receiving digital data according to the second embodiment of the present invention comprises a communication means 13 and a transmitting antenna 14 to transmit request information to a base station 11. On the other hand, the base station 11 comprises a receiving antenna 91 to receive the request information transmitted from the on-vehicle terminal 21 and a request information searching means 9. As the communication means 13 and the transmitting antenna 14 in the on-vehicle terminal 21, for example, a portable phone is available. Here, other constructions in the base station 11 and the on-vehicle terminal 21 and a data structure used for transmitting/receiving digital data are the same as those in the above described first embodiment.

Various kinds of contents can be included in request contents of the request information from the on-vehicle terminal 21. FIG. 9 is a table illustrating an example of request contents of the above request information. For the request information which the on-vehicle terminal 21 transmits to the base station 11, for example, a transmission destination, addresser information, confidentiality, redundancy, transmission frequencies/time, access frequencies, communication quality, an accounting method, a receiving method, and requests are included as indicated in FIG. 9.

A transmission target terminal address (transmission destination terminal address) is used as the transmission destination, and the transmission destination designates the on-vehicle terminal 21 to which the base station 11 provides service information. Therefore, it is possible to send a message addressed to a person through the base station 11, for example.

An address of an addresser (transmission source terminal address) is used as the addresser information, which designates the on-vehicle terminal 21 which transmits the request information to the base station 11. Therefore, it is possible to set the on-vehicle terminal 21 which receives service information from base station 11 so as to select and receive information transmitted from a particular addresser or to refuse receiving information transmitted from a particular addresser on the basis of the transmission source terminal address, for example, by giving the transmission source terminal address in address header information of service information transmitted from the base station 11.

For the confidentiality, codes for showing presence of encipherment or designation of encipherment method are used, and they indicate encipherment of service information provided by the base station 11. Therefore, only the on-vehicle terminal 21 having particular decoding keys for decoding cryptography can decode service information, whereby it is possible to secure confidentiality of information.

For the redundancy, codes showing designation of redundancy in encoding are used, therefore, it is possible to improve error correction ability of data when the redundancy of service information provided from base station 11 is set to be increased.

For the transmission frequency/time, codes for designating transmission time zone or transmission frequency are used, and the base station 11 provides service information to the on-vehicle terminal 21 in the designated time zone or the designated transmission frequency, when the base station 11 receives this request. Therefore, the on-vehicle terminal 21 can receive service information at a convenient time zone, and can easily know that a receiving error occurs when service information from the base station 11 is not to be received during the designated time zone. Further, by designating a plurality of transmission frequencies, a user's strong demanded information can be obtained in on-vehicle terminal 21.

For the access frequency, codes showing presence of same request are used, and they indicate if the on-vehicle terminal 21 has ever received the same service information or not.

For the communication quality, codes showing a method for securing data quality are used, and the codes designate a modulation method when the base station 11 distributes service information. For example, a data transmitting means 3 in the base station 11 comprises a modulator of 64 QAM modulation method and modulator of QPS modulation method, and data is modulated by 64 QAM modulator whose transmission capacity is comparatively large when data quality is not so required, while data is modulated by QPSK modulator when data quality should be improved even if transmission capacity becomes comparatively small. Further, the data quality enables to designate information amount of requested data. For example, in requesting transmission of voice data, as voice data quality, a sampling rate of a signal (e.g., sampling frequency), the number of data reproducing channels (e.g., the number of channels of analog or stereo, etc.) can be designated. In case of requesting to transmit image data, it is possible to designate the number of display colors (e.g., two colors or full colors, etc.), picture quality in displaying data, and the number of moving picture frames as image data quality.

For the accounting method, codes for designating the accounting method are used. For example, it is possible to perform accounting in accordance with an error occurring rate of service information provided by the base station 11, or it is possible to designate account settlement method (designate payment method) which a terminal user desires.

For the receiving method, codes for showing mobile receiving or fixed receiving are used, and they show whether a terminal which receives service information from the base station 11 is installed on a mobile object or a fixed object. When the terminal which receives the information is a mobile object terminal such as an on-vehicle terminal, receiving condition is changed by that position environment of the terminal. Therefore, to secure data quality the redundancy of distributed data, data is transmitted by a modulation method which has a resistance to errors on the base station 11 side. Also, for this receiving method, in addition to showing whether it is mobile receiving or fixed receiving, it is possible to further add codes or showing also receiving position of the terminal.

The request designates desired data, and instructs what kind of information is to be provided, for example, map data, traffic, information, route guide information and area information as contents of service information, as described above in the first embodiment. When a terminal user transmits information, it is also possible to add the data which the terminal user (information transmitter) wants to transmit.

Next, the method for transmitting/receiving digital data according to the second embodiment is simply described. At first, request information is input to the operation input means 12, next, the request information is coded/compressed to generate a digital signal by the communication means 13, and the digital signal is transmitted by the transmitting antenna 14 to the base station 11 through such as a portable phone circuit, to transmit the request information from the on-vehicle terminal 21 to the base station 11. This digital signal of the request information transmitted from the on-vehicle terminal 21 is received by the receiving antenna 91 in the base station 11, and demodulated/decoded by the request information searching means 9 to extract the request information, and the request information is held in the service information DB1. The generation of transmission data is performed based on the request information after extracting the request information from the service information DB1 by the data generation means 2, thereby enabling for the base station 11 which receives the request information to provide the on-vehicle terminal 21 with the service information. For the generation of transmission data, various kinds of identification information are added to header information of service information in the same way as the above first embodiment. Next, the data generated by the data generating means 2 is modulated to a digital signal by data transmitting means 3, and transmitted to the on-vehicle terminal 21 through the transmitting antenna 31. Here, reproduction processing of received data in the on-vehicle terminal 21 is performed in accordance with the procedure shown in the flow chart of FIG. 7 as described in the first embodiment.

As described above, according to the second embodiment, in the on-vehicle terminal 21, the request information is transmitted to the base station 11 through the communication means 13 and the transmitting antenna 14, and in the base station 11, the request information received by the receiving antenna 91 is analyzed by the request information searching means 9 and the service information is provided based on the result of this analysis. Therefore the base station 11 as a data provider enables to provide service information in a form which meets the demand of the on-vehicle terminal 21 as a request addresser, and also the on-vehicle terminal 21 as a request addresser enables to receive desired service information in a desired form.

Embodiment 3

The third embodiment is related to a method for generating and decoding application data dealt between the base station and the on-vehicle terminal in the above first and second embodiments.

Figure 10:
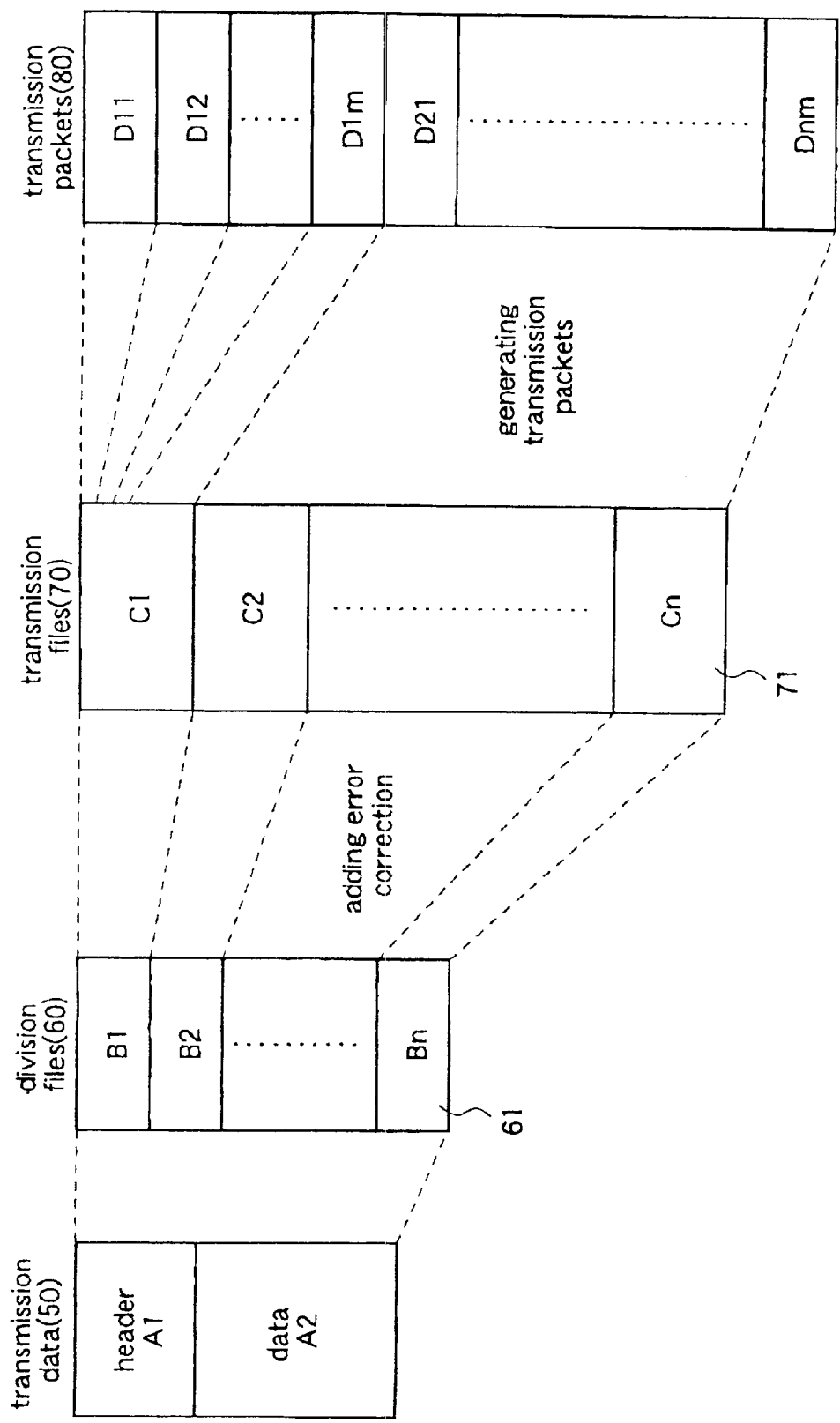
FIG. 10 is a diagram showing a structure of transmitting side application data which is dealt by a base station unit used in a digital data transmitting/receiving method according to a third embodiment of the present invention.
Figure 11:
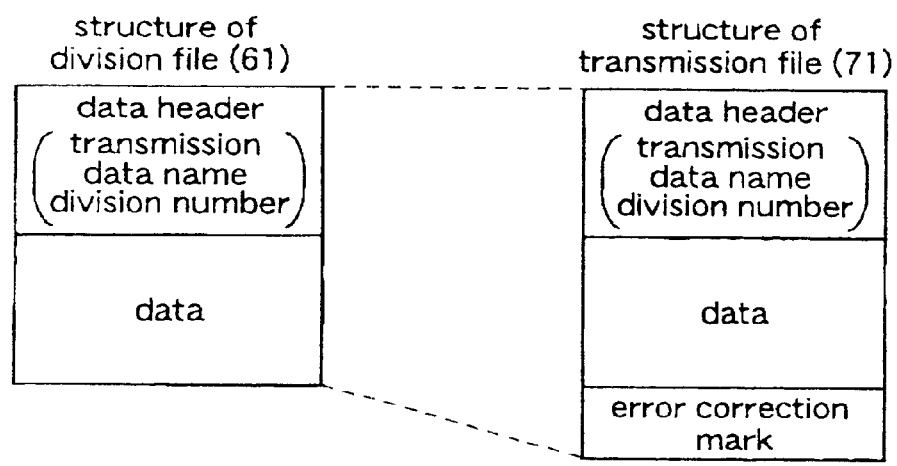
FIG. 11 is a diagram showing structures of a divided file and a transmission file shown in FIG. 10.
Figure 12:
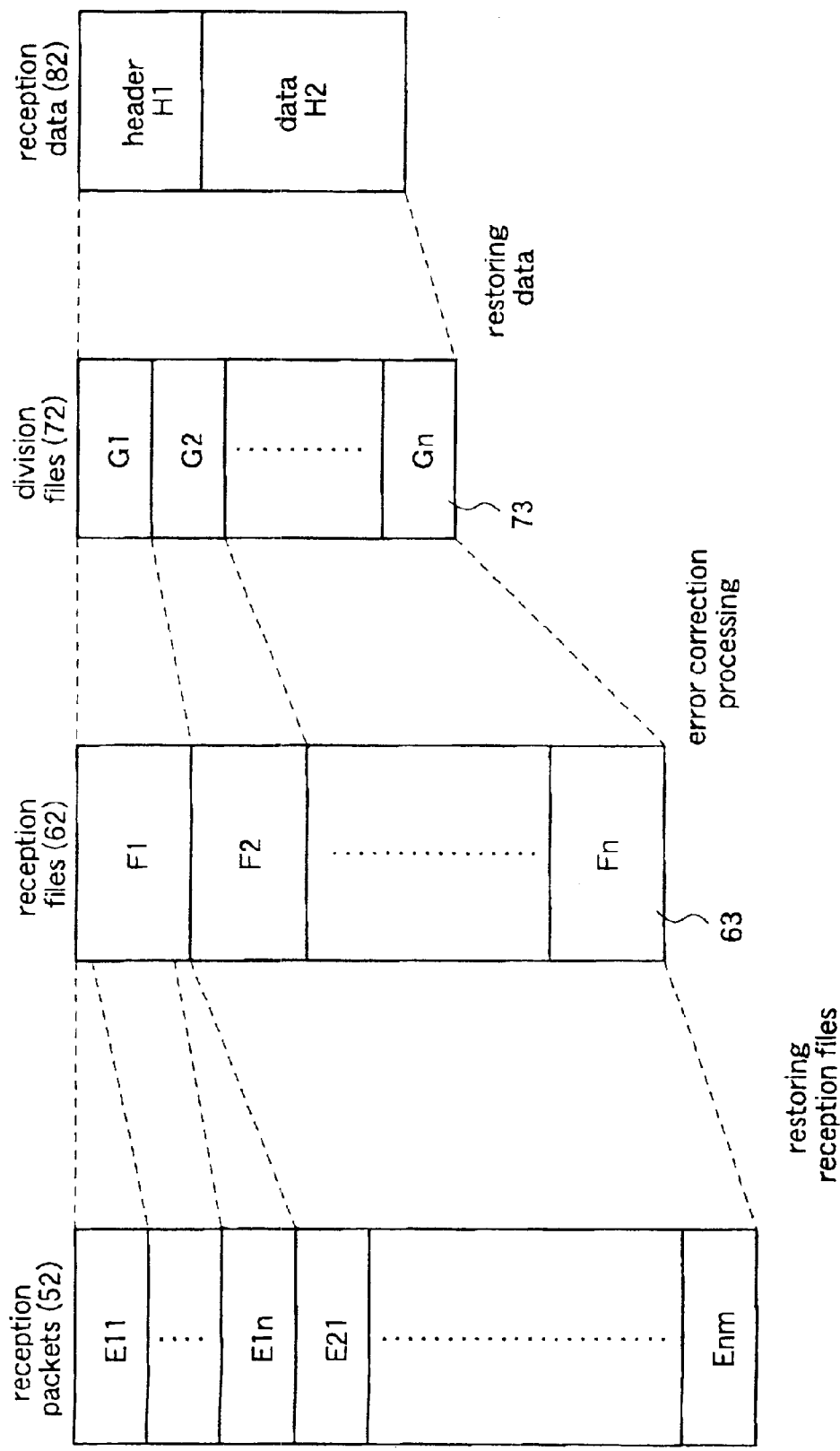
FIG. 12 is a diagram showing a structure of a receiving side application data which is dealt by a mobile object terminal unit used in the digital data transmitting/receiving method according to the third embodiment.
Figure 13:
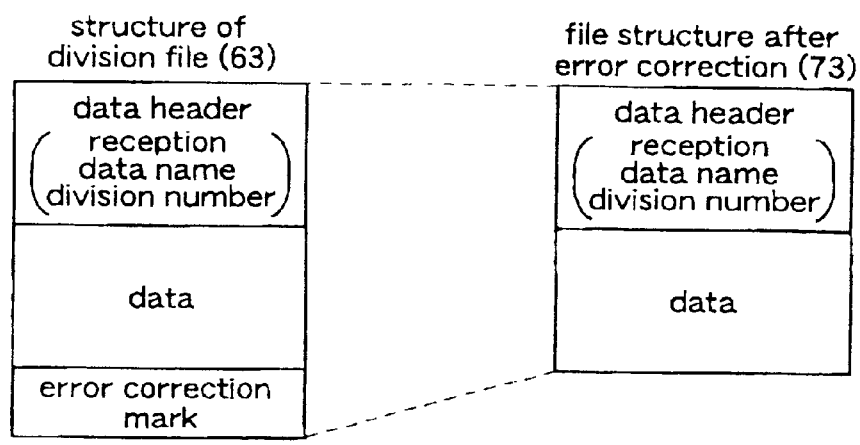
FIG. 13 is a diagram showing structures of a received file and a divided file shown in FIG. 12.

FIG. 10 is a drawing illustrating a method for generating application data in the base stations 10 and 11, and FIG. 11 is a drawing illustrating file structures of division files and transmission files in FIG. 10. FIG. 12 is a drawing illustrating a method for decoding application data in the on-vehicle terminals 20 and 21, and FIG. 13 is a drawing illustrating file structures of reception files and division files in FIG. 12.

According to the third embodiment, service information provided by the base stations 10 and 11 is transmitted as a transmission packet, and this transmission packet is generated by the data generating means 2 as shown in FIG. 10 in accordance with the following order: transmission data (50)→division files (60)→transmission files (70)→transmission packets (80).

The transmission data (50) is composed of a header A1 and data A2. The header A1 includes the above described identification information, which is correspondent to an address header, a permission header and a data identification header etc. The data A2 is information such as a picture image and voice stored in the service information DB1, which is correspondent to data map, traffic information, route guide information etc.

Next, n pieces of division files (60) B1, B2, . . . Bn are created by dividing this transmission data (50) without discriminating between the header A1 and the data A2. A structure of each of division files (61) is composed of a data header part showing a transmission data name and a division number etch, and a data part including divided transmission data (50), as shown in FIG. 11. Here, a combination order of division files is not necessarily the same order as the order in dividing the transmission data (50), and it is allowed to combine the division files at random. In case of the random combination, since errors are dispersed in image data such as still images and moving images, it is effective to improve error correction ability.

Next, the transmission files (70) C1, C2, . . . Cn are created by adding an error correction mark to each of division file (61) of these division files (60) B1, B2, . . . Bn. A structure of this each transmission file is composed of a data header part, a data part, and an error correction mark as shown in FIG. 11. Here, while in the figure, the transmission file (71) is shown so as to have a structure in which the data header part, the data part, and the error correction mark are distinguished definitely in a prescribed area, there is no boundary between each part in reality.

Next, the transmission packets (80) D11, D12, . . . D1m . . . Dnm composed of totally n×m pieces of packets are created by dividing each transmission file of these transmission files (70) C1, C2, . . . Cn by m pieces.

And the base stations 10 and 11 transmits the files in the form of transmission packets generated in accordance with the above procedure to the on-vehicle terminals 20 and 21 through the data transmitting means 3 and the transmitting antenna 31.

On the other hand, on the on-vehicle terminals 20 and 21, the above transmission packets (80) are received as reception packets through the receiving antenna 41 and the data receiving means 4. The data restoration of these reception packets is performed by the data recognition means 6 in accordance with the following order: reception packets (52)→reception files (62)→division files (72)→reception data (82) as shown in FIG. 12. That is to say, the data is restored in accordance with the inverse procedure to that in transmitting in the base stations 11 and 12.

In the data recognition means 6, a reception file F1 is created from the reception packets (52) E11, E12, . . . E1m among the obtained n×m pieces of reception packets E11, E12, . . . E1m . . . Enm. In the same way, a reception packet F2 is created from the reception packets (52) E21, E22, . . . E2m, and the following reception files (62) F1, F2, . . . Fn are created in the same way. A structure of this each reception file (63) is composed of a data header part, a data part, and an error correction mark as shown in FIG. 13. Here, while in the figure, the receiving file (63) is shown so as to have a structure in which the data header part, the data part, and the error correction mark are distinguished definitely in a prescribed area, there is no boundary between each part in reality.

Next, data errors of the reception files are corrected by utilizing the error correction marks included in the reception files (62) F1, F2, . . . Fn. After correcting errors, the division files (72) G1, G2, . . . Gn are created by extracting the error correction marks which are added in transmitting. A structure of this each division file (73) is composed of a data header part showing a transmission data name and a division number, and a data part as shown in FIG. 13.

Next, data restoration of these division files (72) G1, G2, . . . Gn is performed in accordance with the division number in the data header part, and the reception file (82) is created. This reception data (82) is composed of a header Hi and data H2 correspondent to the header A1 and the data A2 of the transmission data (50) as shown in FIG. 10. Here, in the division files (72), even when a part of the division files, G2, cannot be obtained because of communication troubles etc., in case that the other division files, G1, G3, . . . Gn can be received normally, it is possible to restore data included in the lacking division file G2 by utilizing the error correction marks.

As described above, according to this third embodiment, the base stations 10 and 11 divide the transmission data (50) after adding the header information to the service information into a plurality of the division files (60), create the transmission files (70) by adding the error correction marks to the division files (60), create transmission packets (80) by combining the transmission files (70) after dividing the same into a plurality of pieces, and transmit the transmission packets (80) to the on-vehicle terminals 20 and 21, on the other hand the on-vehicle terminals 20 and 21 create reception files (62) from received reception packets (52), create the division files (72) after correcting the reception errors of data by utilizing the error correction marks included in the reception files (62), restore the data before transmitted (82) by editing the header part and the data part from the division files (72). Therefore, even when a part of the files cannot be obtained because of communication trouble etc., in case that the division files can be received normally, it is possible to restore the data included in the lacking files by utilizing the error correction marks.

Figure 14:
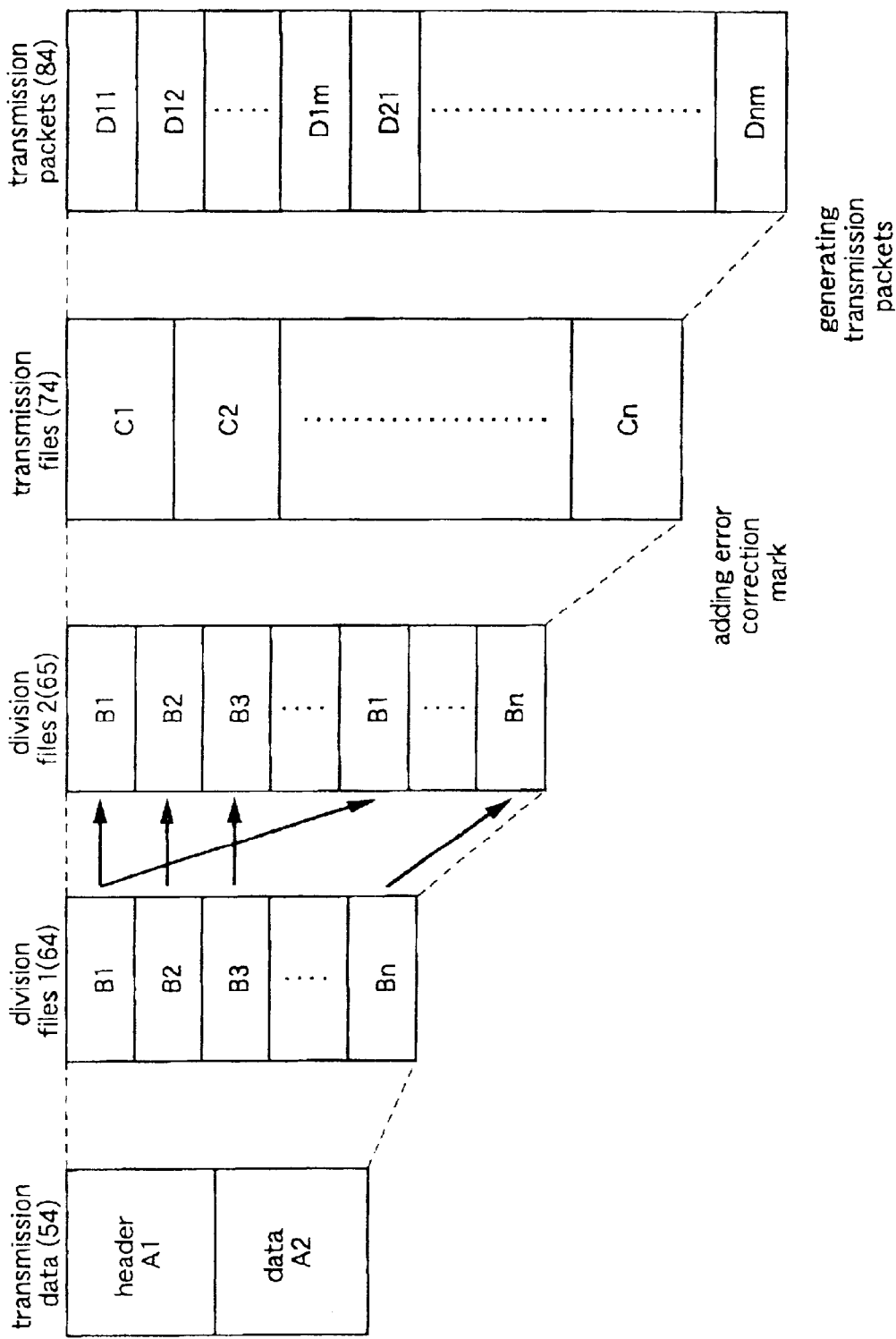
FIG. 14 is a diagram showing another example of a transmitting side application data shown in FIG. 3.

Further, according to this third embodiment, while the division files (60) generated in the base stations 10 and 11 are files created by only dividing the transmission data (50) into a plural pieces, a part including highly significant data such as header information may be copied, and added to the division files. For example, as shown in a FIG. 14, a highly significant division file Bn among division files (64) B1, B2, . . . Bn which are created by dividing transmission data (54) into plural pieces is copied, and is placed and added in a different position, whereby division files (65) are created. And, transmission files (74) are created from these division files (65) and transmission packets (84) are created. Here, while in the on-vehicle terminals 20 and 21, reception data is restored from reception packets in accordance with the inverse procedure to that in transmitting, one of division files received normally without errors from the division files which are copied and added in transmission is left, and the rest of the division files having the same contents are deleted.

As described above, copying and adding division files including highly significant data when the base stations 10 and 11 create the transmission packets enables to reduce lacking of highly significant data when received in the on-vehicle terminals 20 and 21.

What is claimed is:

1. A method for transmitting/receiving digital data between a base station established on the ground and a mobile object terminal installed on a mobile object existing in a service area, wherein the base station provides service information to the mobile object terminal by digital communication by using a broadcasting channel;

the base station transmits the data after identification information is added in header information of the service information which is provided to the mobile object terminal and after the data recognition information related to the service information is further added in the header information of the service information which is provided to the mobile object terminal; and the mobile object terminal has an address showing the identification information, analyzes the identification information by indicating the address, enables to identify whether the service information is provided to the mobile object terminal itself, and analyzes the data recognition information and enables to collect necessary information among the service information which is provided to the terminal itself, wherein the data recognition information is division information of the service information; and the mobile object terminal analyzes the division information and stands by data reproduction processing until all data gather.

2. A method for transmitting/receiving digital data between a base station established on the ground and a mobile object terminal installed on a mobile object existing in a service area, wherein the base station provides service information to the mobile object terminal by digital communication by using a broadcasting channel;

the base station transmits the data after identification information is added in header information of the service information which is provided to the mobile object terminal and after the data recognition information related to the service information is further added in the header information of the service information which is provided to the mobile object terminal; and the mobile object terminal has an address showing the identification information, analyzes the identification information by indicating the address, enables to identify whether the service information is provided to the mobile object terminal itself, and analyzes the data recognition information and enables to collect necessary information among the service information which is provided to the terminal itself, wherein the data recognition information is partly available information of the service information; and the mobile object terminal analyzes the partly available information and performs data processing even when part of the service information is lacking.

3. A method for transmitting/receiving digital data between a base station established on the ground and a mobile object terminal installed on a mobile object existing in a service area, wherein the base station provides service information to the mobile object terminal by digital communication by using a broadcasting channel;

the base station transmits the data after identification information is added in header information of the service information which is provided to the mobile object terminal and after the data recognition information related to the service information is further added in the header information of the service information which is provided to the mobile object terminal; and the mobile object terminal has an address showing the identification information, analyzes the identification information by indicating the address, enables to identify whether the service information is provided to the mobile object terminal itself, and analyzes the data recognition information and enables to collect necessary information among the service information which is provided to the terminal itself, wherein the data recognition information is information indicating a plurality of service information are included; and the mobile object terminal analyzes the data recognition information and performs data processing after performing separation processing of the service information.

4. A method for transmitting/receiving digital data between a base station established on the ground and a mobile object terminal installed on a mobile object existing in a service area, wherein the base station provides service information to the mobile object terminal by digital communication by using a broadcasting channel;

the base station transmits the data after identification information is added in header information of the service information which is provided to the mobile object terminal; and the mobile object terminal has an address showing the identification information, analyzes the identification information by indicating the address, and enables to identify whether the service information is provided to the mobile object terminal itself;

wherein the identification information is a transmission source address and a transmission destination address in the mobile object terminal;

the transmission source address is an address of a mobile object terminal which transmits information to the base station; and the transmission destination address is an address of other mobile object terminal specified by the mobile object terminal which transmits information to the base station.

5. A method for transmitting/receiving digital data between a base station established on the ground and a mobile object terminal installed on a mobile object existing in a service area, wherein the base station provides service information to the mobile object terminal by digital communication by using a broadcasting channel;
   the base station transmits the data after identification information is added in header information of the service information which is provided to the mobile object terminal; and
   the mobile object terminal has an address showing the identification information, analyzes the identification information by indicating the address, and enables to identify whether the service information is provided to the mobile object terminal itself;
   wherein: the identification information is a transmission source address and a transmission destination address in the mobile object terminal; and the mobile object terminal can set receiving refusal of the service information which is provided from a particular transmission source address on the basis of the transmission source address.

6. A method for transmitting/receiving digital data between a base station and a mobile object terminal installed on a mobile object located in a service area, said method comprising:
   adding identification information in header information of service information to be transmitted to the mobile object terminal;
   adding data recognition information related to the service information in the header information of the service information to be transmitted to the mobile object terminal;
   digitally transmitting the service information from the base station to the mobile object terminal via a broadcasting channel;
   wherein the mobile object terminal has an address showing the identification information;
   analyzing the identification information in the mobile object terminal;
   identifying in the mobile object terminal whether the service information is provided to the mobile object terminal;
   analyzing the data recognition information and collecting necessary information among the service information which is provided to the mobile object terminal, wherein the data recognition information is division information of the service information; and
   analyzing in the mobile object terminal the division information and delaying data reproduction processing until all of the data has been received by the mobile object terminal.

7. A method for transmitting/receiving digital data between a base station and a mobile object terminal installed on a mobile object located in a service area, said method comprising:
   adding identification information in header information of service information to be transmitted to the mobile object terminal;
   adding data recognition information related to the service information in the header information of the service information to be transmitted to the mobile object terminal;
   digitally transmitting the service information from the base station to the mobile object terminal via a broadcasting channel;
   wherein the mobile object terminal has an address showing the identification information;
   analyzing the identification information in the mobile object terminal;
   identifying in the mobile object terminal whether the service information is provided to the mobile object terminal;
   analyzing the data recognition information and collecting necessary information among the service information which is provided to the mobile object terminal, wherein the data recognition information is partly available information of the service information; and
   analyzing in the mobile object terminal the partly available information and performing data processing even when part of the service information is lacking.

8. A method for transmitting/receiving digital data between a base station and a mobile object terminal installed on a mobile object located in a service area, said method comprising:
   adding identification information in header information of service information to be transmitted to the mobile object terminal;
   adding data recognition information related to the service information in the header information of the service information to be transmitted to the mobile object terminal;
   digitally transmitting the service information from the base station to the mobile object terminal via a broadcasting channel;
   wherein the mobile object terminal has an address showing the identification information;
   analyzing the identification information in the mobile object terminal;
   identifying in the mobile object terminal whether the service information is provided to the mobile object terminal;
   analyzing the data recognition information and collecting necessary information among the service information which is provided to the mobile object terminal, wherein the data recognition information is information indicating that a plurality of service information are included; and
   analyzing in the mobile object terminal the data recognition information and performing data processing after performing separation processing of the service information.

9. A method for transmitting/receiving digital data between a base station and a mobile object terminal installed on a mobile object located in a service area, said method comprising:
   adding identification information in header information of service information to be transmitted to the mobile object terminal;
   digitally transmitting the service information from the base station to the mobile object terminal via a broadcasting channel;
   wherein the mobile object terminal has an address showing the identification information;
   analyzing the identification information in the mobile object terminal;
   identifying in the mobile object terminal whether the service information is provided to the mobile object terminal;

wherein
- the identification information is a transmission source address and a transmission destination address in the mobile object terminal;
- the transmission source address is an address of a mobile object terminal which transmits information to the base station; and
- the transmission destination address is an address of another mobile object terminal specified by the mobile object terminal which transmits information to the base station.

10. A method for transmitting/receiving digital data between a base station and a mobile object terminal installed on a mobile object located in a service area, said method comprising:

- adding identification information in header information of service information to be transmitted to the mobile object terminal;
- digitally transmitting the service information from the base station to the mobile object terminal via a broadcasting channel;
- wherein the mobile object terminal has an address showing the identification information;
- analyzing the identification information in the mobile object terminal;
- identifying in the mobile object terminal whether the service information is provided to the mobile object terminal;
- wherein the identification information is a transmission source address and a transmission destination address in the mobile object terminal; and
- in the mobile object terminal, accepting or refusing reception of the service information provided from a particular transmission source address based on the transmission source address.

* * * * *